Figure 1:
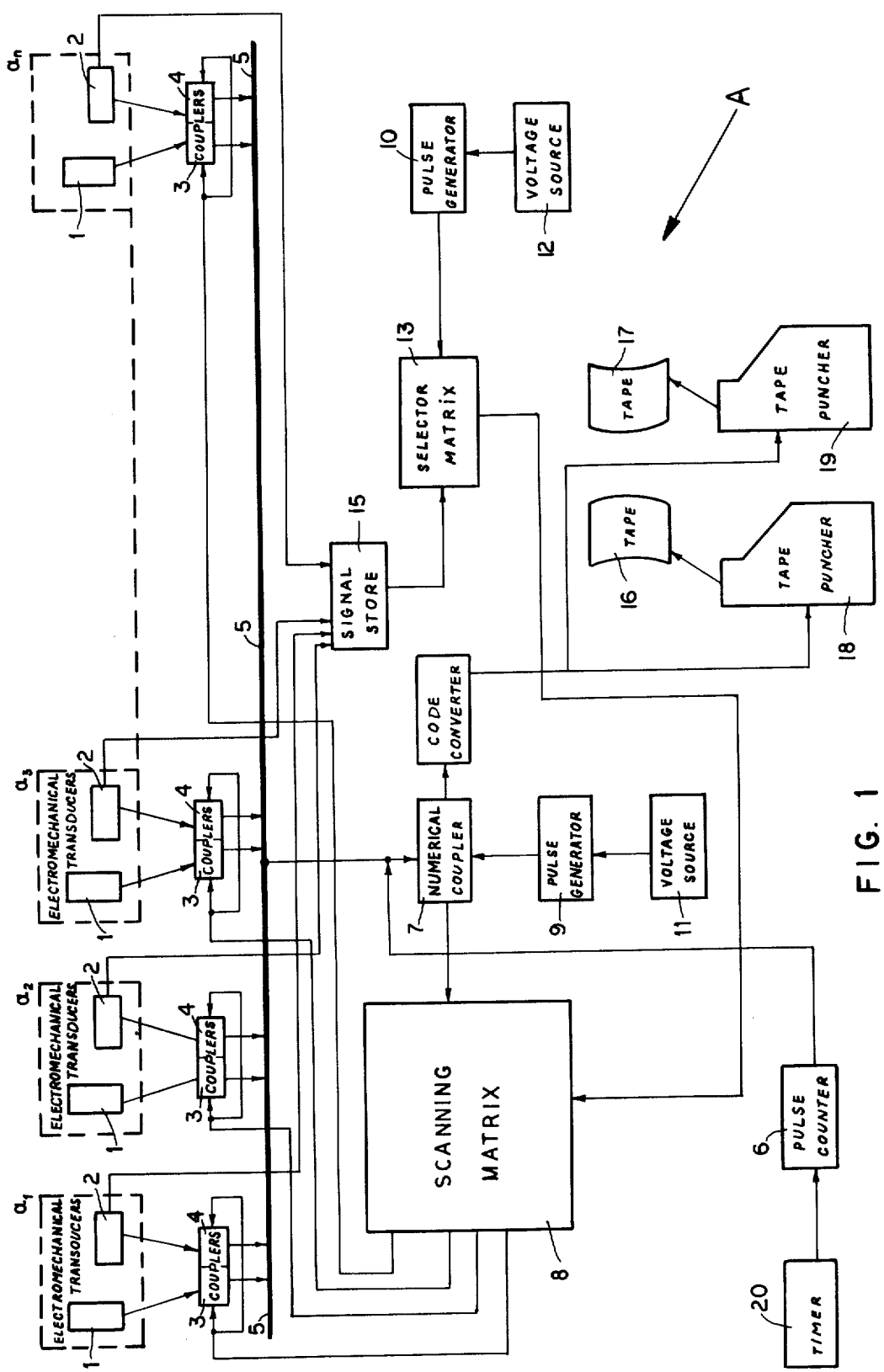

United States Patent [19]

Barna et al.

[11] 4,089,056

[45] May 9, 1978

[54] METHOD AND AUTOMATED EQUIPMENT FOR THE TRACKING, CONTROL AND SYNTHESIZING OF MANUFACTURING PERFORMANCE FIGURES

[75] Inventors: Gheorghe Barna; Silviu Stefan; Mircea Şuşelescu; Cornelius Barbu; Sergiu Chiose; Ioan Lebădă; Florian Negulescu, all of Bucharest, Romania

[73] Assignees: Institutul de Proiectari Tehnologice al Industriei Usoare; Fabrica de Stofe de Mobila, both of Bucharest, Romania

[21] Appl. No.: 672,503

[22] Filed: Mar. 31, 1976

[51] Int. Cl.² .................... G06F 15/36; G06F 15/46
[52] U.S. Cl. .................................. 364/551; 364/468; 364/900
[58] Field of Search ............ 235/151, 151.13, 92 PD, 235/92 T; 364/300, 900

[56] References Cited

U.S. PATENT DOCUMENTS

| | | | |
|---|---|---|---|
| 3,593,008 | 7/1971 | De Witt | 235/151 |
| 3,928,830 | 12/1975 | Bellamy et al. | 340/172.5 |
| 3,930,145 | 12/1975 | Fort et al. | 340/172.5 |
| 3,946,212 | 3/1976 | Nakao et al. | 235/151.1 |
| 3,982,232 | 9/1976 | Etra | 340/172.5 |
| 4,001,785 | 1/1977 | Miyazaki et al. | 340/172.5 |

FOREIGN PATENT DOCUMENTS 1,220,188  6/1966  Germany.

OTHER PUBLICATIONS

Digital Equipment Corp., Digital Control Handbook, 1969, pp. 184, 185.

*Primary Examiner*—Felix D. Gruber
*Attorney, Agent, or Firm*—Karl F. Ross

[57] ABSTRACT

A system for the automatic supervision of a multiplicity of machines in a manufacturing plant includes a set of transducer units individual to the respective machines for converting their operating speeds into binary data which are successively read out, under the control of a scanner sequentially activating respective couplers, to a tape puncher together with data identifying the machines and their operators. The punched tape is then fed to a computer which interprets the received data and passes out the results on another tape scanned by a reader for purposes of visual display and transmission to an instrument panel.

3 Claims, 3 Drawing Figures

METHOD AND AUTOMATED EQUIPMENT FOR THE TRACKING, CONTROL AND SYNTHESIZING OF MANUFACTURING PERFORMANCE FIGURES

Our present invention relates to a system for automatically tracking, controlling and synthesizing production figures, enabling optimization of manufacturing procedures by achieving high accuracy and promptitude in making operational decisions through the surveillance of the successive stages of production development and of the occurrence of random events directly affecting the manufacturing process within one department or for the whole enterprise.

Conventional systems for automatic computer-assisted production monitoring have as their main disadvantage the complexity of the data-collecting equipment.

The system according to the invention eliminates the above-mentioned disadvantage by providing for the automatic survey, selection and collection of data to be visualized through the intermediary of a computer, with display of production data on a departmental instrument panel and of breakdown information in the several manufacturing areas.

Figure 2:
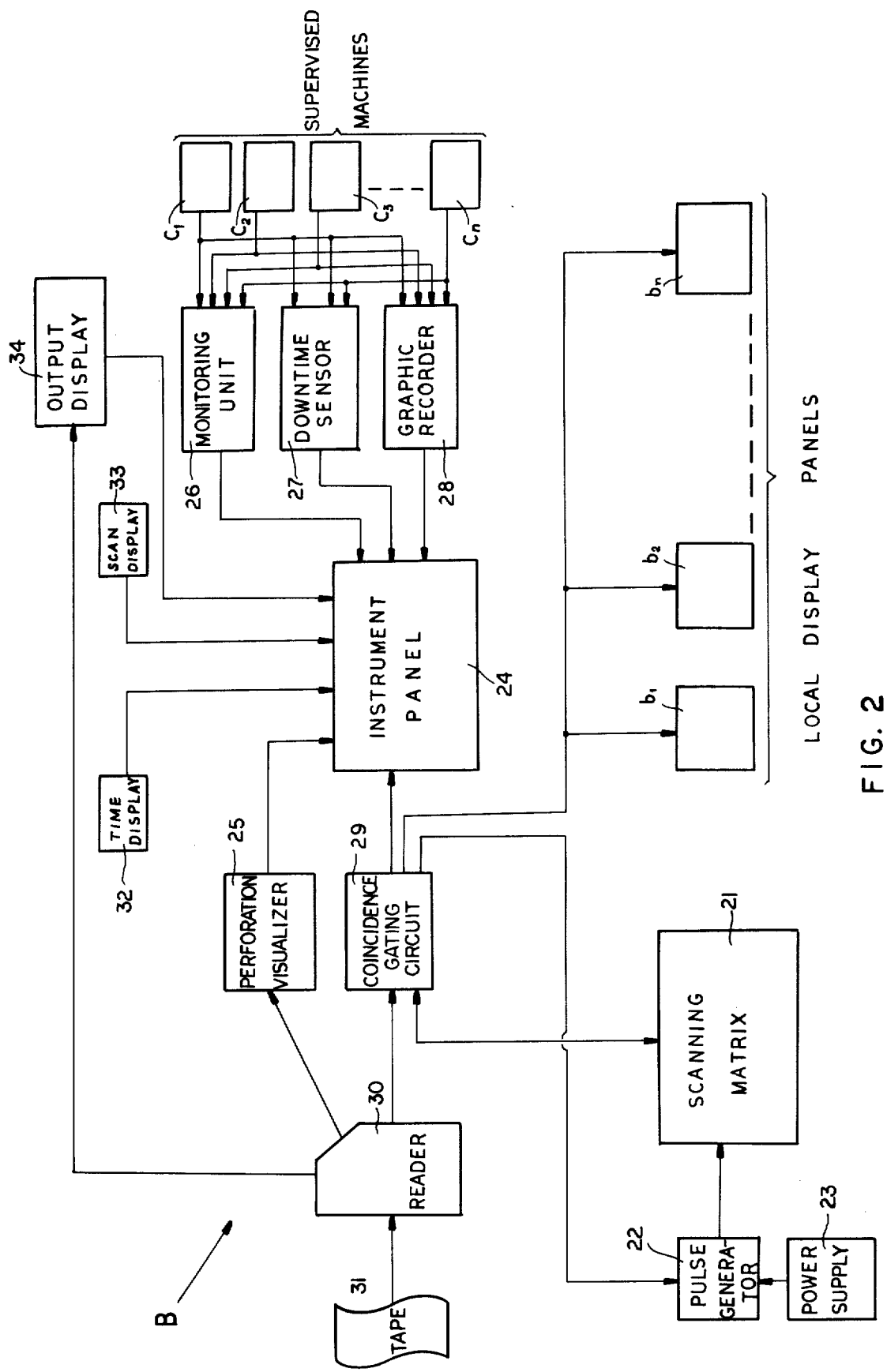
Figure 3:
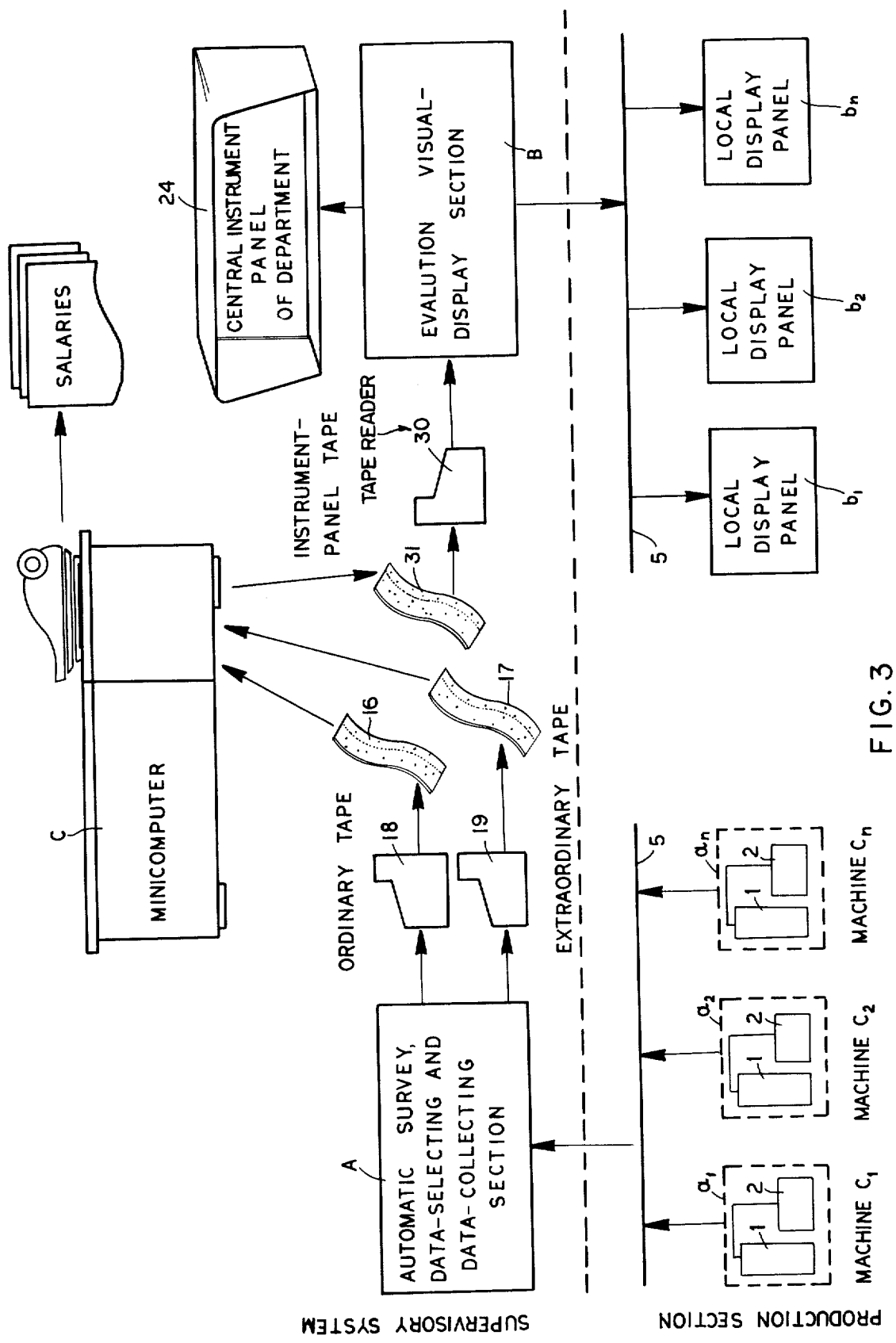

A system according to our invention comprises a multiplicity of electromechanical transducer units associated with respective machines to be supervised, generating coded information indicative of the performance of these machines. A scanner sequentially activates a set of couplers, respectively connected to these transducer units, to read out their coded information to a common transmission line for storage on a first carrier, such as a perforated tape, with the aid of suitable recording means such as a tape puncher. The information so stored is evaluated in a computer receiving the first carrier and emitting the evaluation results on a second carrier which may also be a perforated tape and whose contents are transmitted by a reader to a display panel. Advantageously, pursuant to a further feature of our invention, the transmission of the evaluation results from the reader to the display panel takes place at certain periods under the control of a timer-operated gating circuit. An embodiment of our invention will now be described, as a nonlimitative example, with reference to the accompanying drawing in which:

FIG. 1 is a block diagram of a plant equipped with a supervisory system according to our invention;

FIG. 2 is a block diagram of monitoring and data-processing equipment associated with the plant of FIG. 1; and FIG. 3 is a block diagram showing the overall layout of the system. As seen in FIG. 3, a system embodying our invention comprises a section A for the automatic survey, selection and collection of data, a section B for evaluation and display of the information gathered in section A, and a minicomputer used for preliminary processing.

Section A, more fully shown in FIG. 1, serves for surveying machinery and equipment condition and recording their metered production, the technical defects occurring during operation, worker and machine codes, and shift times. This section comprises blocks of electromechanical transducers $a_1, a_2 \ldots a_n$, each block being assigned to a respective machine $c_1, c_2, \ldots c_n$ (FIGS. 2 and 3) and includes two transducers 1 and 2 working through respective coupling blocks 3 and 4 into a transmission line 5. A timer 20 steps a pulse counter 6 working into a numerical coupler 7 driving a scanning matrix 8; two pulse generators 9 and 10, energized by respective supply units 11 and 12, respectively control a selector 13 and a code converter 14. A signal store 15 has inputs connected to all transducers 2; two tape punchers 18, 19 serve to perforate two tapes 16 and 17.

Transducer 1 translates machine rpm into a binary code, while transducer 2 carries out the conversion into binary code of worker code, machine code and technical defects of an electric, mechanical or technological nature.

Couplers 3 are operated by the scanning matrix 8 and transmit the primary information to the transmission line 5 conveying it to coupler 7 for eventual registration in tape 16 which therefore records machine rpm.

Coupler 4 is operated by transducer 2, on the one hand, and by the selector matrix 13, on the other hand.

Device 6 counts the pulses coming from the timer 20 for the purpose of entering shift time into the perforated tape 16.

The numerical coupler 7 controls the punching operation, in decimal notation, of machine rpm, technical-defect-cause code, and shift-time code.

The scanning matrix 8 sequentially connects the coupling devices 3 and 4 to the transmission line 5 and is composed of shift registers, signal shapers and amplifiers.

The pulse generator 9 delivers the pulses required for punching the tape 16, and generator 10 delivers pulses having the searching frequency of selector matrix 13.

Supply units 11 and 12 are stabilized voltage sources protected against overload.

Matrix 13 selects on demand a certain position in case a perforated card is introduced into or extracted from transmitter 2. The electronic coding block 14 converts the binary code of the signals coming from transducers 1 and 2 into the computer code.

The punching blocks 18 and 19 are independent tape punchers and signals generated by transducers 2 are stored in block 15 until machine number, worker code, rpm and shift time have been registered on tape 17.

The evaluation and optical-display section B (FIG. 2) comprises a scanning matrix 21, a pulse generator 22, a power supply 23, a central instrument panel 24, several optical display panels $b_1, b_2 \ldots b_n$, a visualizer 25 for the perforations, a monitoring unit 26, a sensor 27 of downtimes broken down according to causes, an operation-ratio recorder 28, a coincidence or gating circuit 29, a punched-tape reader 30, an instrument-panel tape 31, a device 32 for the display of the electronic clock indications on the central instrument panel 24, a device 33 for the optical display of the scan of matrix 21 on the instrument panel 24 of the department, and a device 34 for displaying the achieved output, the planned output and their difference on panel 24. Machines $c_1, c_2, c_3 \ldots c_n$ work in parallel into units 26-28.

The scanning matrix 21 is formed from electronic components and ensures the synchronous coupling of the various positions of the display with the speed of reader 30 for the perforated tape 31 while also controlling the device 34 for the display of achieved and planned output and any differences therebetween.

The electronic pulse generator 22 issues pulses to the shift registers and is fed from the stabilized voltage source 23.

On the central instrument panel 24 there are displayed data concerning machine and equipment condition from unit 26, equipment failures from unit 27, operation-ratio figures from unit 28, planned output, achieved output and output difference from unit 34, shift time from unit 32, tape perforations from visualizer 25, and search in the scanning matrix 33.

Local optical signaling panels $b_1 \ldots b_3$ are located in each production zone and the situation of the zone — whether in step with the plan or lagging behind — is displayed on them.

Visualizer 25 produces on the instrument panel 24 an indication of the punching speed of the tape perforators 18 and 19.

Monitoring unit 26 has the purpose of selecting on demand any piece of machinery and surveying it for a certain predetermined period during which downtimes are checked and their causes are recorded.

Unit 27 senses equipment downtimes and displays them, for each position individually, on the department instrument panel 24.

Unit 28 is a graphic recorder and is directly connected to the machines or pieces of equipment $c_1$–$c_n$, providing a graphical display of production efficiency.

Gating circuit 29 synchronizes the pulses coming from the perforated-tape reader 30 with those emitted by the scanning matrix 21 and delivers pulses to be used on instrument panel 24, pulse generator 22 and optical display blocks $b_1, b_2, \ldots b_n$ in the production departments.

Reader 30 scans the perforated tape 31 of the instrument panel 24, transmitting pulses in binary code to the coincidence circuit 29, the monitoring unit 25 and the display device 34.

Device 34 provides an optical display of the achieved and planned outputs and of the difference thereof, converting the data on the perforated tape into an optical display of successive figures. This unit is composed of coding circuits, decimalfraction-determining circuits and a memory-control circuit.

The information generated by sections A and B is registered on the two perforated tapes 16 and 17 which are processed on computer C, after which the information from the "ordinary" tape 16 is utilized for the optical display and for making operating decisions, whereas the information from the "extraordinary" tape 17 is used for wage and salary computation, dead-time computation and statistical analysis in connection with various aspects of the manufacturing process.

The advantages of our automatic supervisory and control system can be summarized as follows:

It informs the working-group managers of the stage of plan fulfillment for each equipment zone;

it eliminates the intervention of man in data collection, processing and transmittal, resulting in labor saving by dispensing with the working group which now keeps production records;

it obviates the occurrence of errors which are inherent in manual data processing;

in collaboration with the associated minicomputer it facilitates calculation of wages;

it allows equipment operation to be surveyed from the control room;

it makes it possible to detect critical periods, during which efficiency is decreased, with a view to ascertaining the causes of such periods;

it makes it possible for the management of the enterprise to be continuously aware of the manner in which production is carried out, even when other engagements prevent it from having immediate contact with the manufacturing sections; and it can be adapted to any piece of equipment whose output is, or can be, metered.

We claim:

1. A system for the automatic supervision of a multiplicity of machines in a manufacturing plant, comprising:

a multiplicity of electromechanical transducer units each associated with a respective machine to be supervised for generating coded information indicative of the performance of the machine;

a multiplicity of couplers respectively connected to said transducer units;

scanning means for sequentially activating said couplers to read out said coded information to a common transmission line;

recording means connected to said transmission line for storing on a first carrier the coded information sequentially read out;

evaluation means for processing the information so stored, said evaluation means including a computer receiving said first carrier and emitting the evaluation results on a second carrier;

a reader responsive to the contents of said second carrier; and display means connected to said reader.

2. A system as defined in claim 1 wherein said recording means comprises a tape puncher, said carriers being perforated tapes.

3. A system as defined in claim 1, further comprising gating means inserted between said reader and said display means, and timing means connected to said gating means for controlling the transmission of said evaluation results from said reader to said display means.